United States Patent [19]

Westveer

[11] 4,197,705

[45] Apr. 15, 1980

[54] HYDRAULIC CONTROL SYSTEM

[75] Inventor: Robert C. Westveer, Kalamazoo, Mich.

[73] Assignee: General Signal Corporation, Stamford, Conn.

[21] Appl. No.: 910,726

[22] Filed: May 30, 1978

[51] Int. Cl.[2] .............................................. F16H 39/46

[52] U.S. Cl. ........................................ 60/445; 60/462; 60/484; 60/494; 417/212

[58] Field of Search ................. 60/445, 450, 462, 494, 60/484; 417/212

[56] References Cited

U.S. PATENT DOCUMENTS

| | | | |
|---|---|---|---|
| 3,777,492 | 12/1973 | Boydell et al. | 60/462 |
| 3,788,077 | 1/1974 | Johnson et al. | 60/452 |
| 4,067,193 | 1/1978 | Norick | 60/445 |

*Primary Examiner*—Edgar W. Geoghegan
*Attorney, Agent, or Firm*—Thomas R. FitzGerald; Jeffrey S. Mednick

[57] ABSTRACT

A hydraulic control system is provided including a fluid reservoir, a variable displacement pump having a fluid input in fluid communication with the reservoir and having a fluid output, and a fluid actuated displacement control mechanism for controlling the displacement of the pump. A control valve is placed in fluid communication with the fluid output of the variable displacement pump and with the reservoir and is adapted to control the flow of fluid to a fluid actuated device. The control valve includes means for developing a control pressure signal. A sensor valve is placed in fluid communication with the control pressure signal, the displacement control mechanism, and the reservoir for placing the control pressure signal in fluid communication with the displacement control mechanism or for placing the displacement control mechanism in fluid communication with the reservoir, in response to the magnitude of the pressure control signal, thereby controlling the displacement of the pump in response to the magnitude of the pressure control signal. The control valve includes a plurality of plungers for controlling the flow of fluid between a central passageway, a supply manifold, service ports, and an exhaust manifold. Each of the plungers includes a plurality of metering notches for providing the only continuous flow path through the central passageway between the inlet and the exhaust port when the plungers are between a neutral position and an operating position. The fluid actuated displacement control mechanism is mechanically connected to the pump for controlling its displacement. The mechanism is provided with a fluid passage for placing the mechanism in fluid communication with the pump drain. The fluid passage includes a flow restriction which varies in response to the position of the mechanism.

22 Claims, 6 Drawing Figures

HYDRAULIC CONTROL SYSTEM

BACKGROUND OF THE INVENTION

The present invention relates generally to a hydraulic control system for distributing fluid to a plurality of fluid actuated devices and more particularly to such a hydraulic control system for use with a variable displacement pump.

It is frequently necessary for a single hydraulic pump to provide sufficient hydraulic fluid to operate a plurality of fluid actuated devices. For many years fixed displacement pumps have been utilized in combination with open center control valves to distribute the fluid to the desired fluid actuated device. In those instances where the control valve was placed in a neutral position, providing no distribution of fluid to the fluid actuated device, these systems were subjected to excessive flow pressure, power losses and heat dissipation problems. Additionally, in those instances where the fluid actuated devices utilize only a portion of a fixed pump displacement, the remainder of the pump power is wasted.

To overcome these difficulties variable displacement pumps have been used in combination with closed center control valves to achieve better system efficiency. In some applications the variable displacement pumps have been provided with pressure compensated controls. In these applications the pump idles at maximum system pressure. As a result, the control valve must meter down to the actual load pressure, which may provide a very large pressure drop across the valve. Such large pressure drops also result in a very inefficient use of energy.

In still other applications variable displacement pumps in combination with a closed center control valve have been utilized in a load sensitive system. Such a system requires the use of a flow demand control valve for sensing the differential pressure between the pump inlet and some controlled point in the fluid supply to the load. Such load sensitive systems suffer from the disadvantage of being quite complex and therefore expensive to manufacture. Additionally, such load sensitive systems may be fooled in those circumstances where a load is being lowered with the aid of the force of gravity. Under these circumstances the load signal may reverse, resulting in diminished pump output rather than the desired increase in pump output.

Many of the aforementioned problems are discussed and solved by the type of control system disclosed in U.S. Pat. No. 3,788,077 to Johnson, et al. This patent shows a hydraulic control system for a variable displacement pump including a standard open center type of control valve, and a standard fluid actuated displacement control mechanism for the pump. A control pressure signal indicative of pump output pressure is developed in the control valve and this control pressure signal is utilized to control the position of a sensor valve. The sensor valve in turn controls communication between the pump and the displacement control mechanism and communication between the displacement control mechanism and a reservoir. Systems of this type have generally lacked the responsiveness required for the control of many fluid actuated devices.

SUMMARY OF THE INVENTION

Accordingly, a hydraulic control system is provided having a fluid reservoir, a variable displacement pump having a fluid input in fluid communication with the reservoir and having a fluid output, and a fluid actuated displacement control mechanism for controlling the displacement of the pump. A control valve is placed in fluid communication with the fluid output of the variable displacement pump and with the reservoir and is adapted to control the flow of fluid to a fluid actuated device. The control valve includes means for developing a control pressure signal. A sensor valve is placed in fluid communication with the control pressure signal, the displacement control mechanism, and the reservoir for placing the control pressure signal in fluid communication with the displacement control mechanism or for placing the displacement control mechanism in fluid communication with the reservoir, in response to the magnitude of the pressure control signal, thereby controlling the displacement of the pump in response to the magnitude of the pressure control signal. The control valve includes a plurality of plungers for controlling the flow of fluid between a central passageway, a supply manifold, service ports, and an exhaust manifold. Each of the plungers includes a plurality of metering notches for providing the only continuous flow path through the central passageway between the inlet and the exhaust port when the plungers are between a neutral position and an operating position. The fluid actuated displacement control mechanism is mechanically connected to the pump for controlling its displacement. The mechanism is provided with a fluid passage for placing the mechanism in fluid communication with the pump drain. The fluid passage includes a flow restriction which varies in response to the position of the mechanism.

OBJECTS OF THE INVENTION

An object of the present invention is the provision of a hydraulic control system which is capable of controlling the distribution of fluid to a plurality of fluid actuated devices in a highly efficient and responsive manner.

Another object of the present invention is the provision of a hydraulic control system for controlling the distribution of fluid to a plurality of fluid actuated devices which system is not subject to signal reversals as a result of gravitational forces acting on the fluid actuated devices.

A further object of the present invention is the provision of a hydraulic control system for a variable displacement pump which requires the use of only a single control line to the pump.

A further object of the present invention is the provision of a hydraulic control system for a variable displacement pump, including a control valve that develops a control pressure signal for the pump which is responsive to the position of individual valve plungers.

Still another object of the present invention is the provision of a hydraulic control system for a variable displacement pump, including an improved displacement control mechanism for the pump.

Yet another object of the present invention is the provision of a hydraulic control system for a variable displacement pump which may be easily manufactured by making relatively simple and inexpensive modifications to existing control systems.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
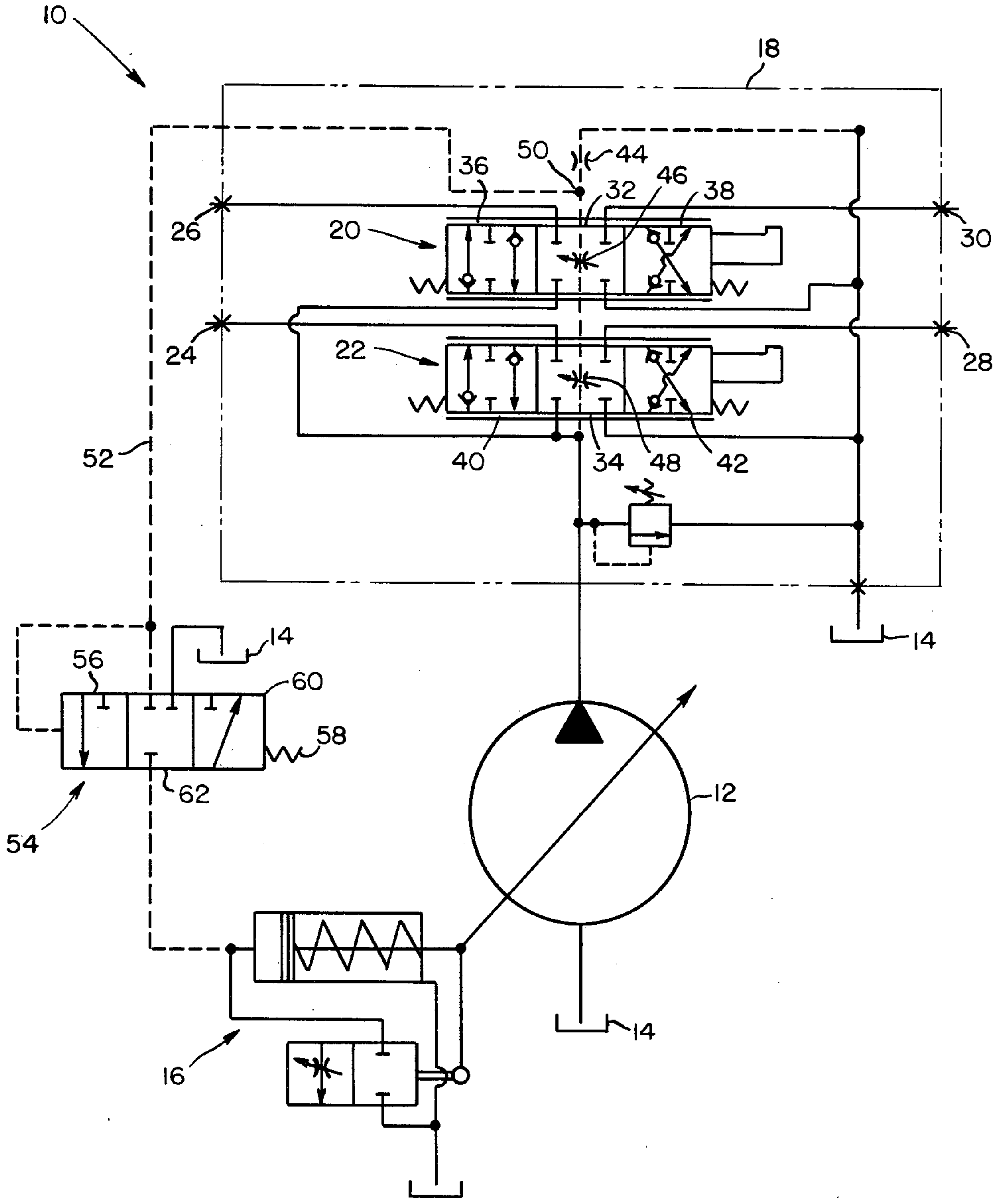
FIG. 1 is a graphic diagram of a first embodiment of the hydraulic control system of the present invention.

Referring to FIG. 1, a hydraulic control system 10 is provided for controlling the distribution of fluid to a plurality of fluid actuated devices (not shown). A variable displacement pump has its fluid input in fluid communication with a reservoir 14. The pump 12 is provided with a fluid actuated displacement control mechanism 16 for controlling the displacement of the pump 12. A control valve 18 including a plurality of plungers 20 and 22 is placed in fluid communication with the fluid output of the variable displacement pump 12 and with the reservoir 14. The control valve 18 is adapted to control the flow of fluid to a plurality of fluid actuated devices (not shown) by connecting the devices to a plurality of service ports 24, 26, 28 and 30. Each of the plungers 20 and 22 includes a neutral position 32 and 34, respectively, in which fluid communication between the variable displacement pump 12 and the service ports 24, 26, 28 and 30 is blocked. Each of the plungers 20 and 22 also include a pair of operating positions 36 and 38, and 40 and 42, respectively, for placing the output of the variable displacement pump 12 in fluid communication with a service port.

The control valve 18 further includes means for developing a control pressure signal including a fixed orifice 44 for restricting flow between the variable displacement pump 12 and the reservoir 14. Each of the plungers 20 and 22 further includes means graphically illustrated as variable orifices 46 and 48 respectively, for restricting flow in the flow path between the variable displacement pump 12 and the fixed orifice 44 when the plungers 20 and 22 are between their neutral positions 32 and 34 and one of their operating positions. The flow restricting means 46 and 48 provide a variable restriction in the flow path as the plungers 20 and 22 are moved from their neutral positions toward one of the operating positions. It should be understood that although only two plungers are illustrated in this graphic respresentation that this is by way of illustration only, and that any suitable number of plungers may be utilized in accordance with the principles of the present invention. The control pressure signal is developed by positioning a control pressure port 50 between the flow restricting means 46 and the fixed orifice 44. The control pressure signal is then delivered along line 52 to a sensor valve 54.

The sensor valve 54 is also in fluid communication with the displacement control mechanism 16 and the reservoir 14. The sensor valve 54 includes three operating positions. The sensor valve 54 is fluid biased by the control signal 52 toward a first operating position 56 in which the control pressure signal 52 is placed in fluid communication with the displacement control mechanism 16. Should the control pressure signal 52 apply a lower bias to the sensor valve 54 than a spring 58, the sensor valve 54 is spring biased into a second operating position 60 in which the displacement control mechanism 16 is placed in fluid communication with the reservoir 14. Should the control pressure signal bias equal the spring bias on the valve 54, the valve will be placed in a neutral position 62 for blocking fluid communication between the control signal 52, the displacement control mechanism 16, and the reservoir 14.

To consider typical operating conditions of the hydraulic control system of the present invention, it will be assumed that each pair of service ports 24 and 28, and 26 and 30, respectively, is connected to a fluid actuated device (not shown). Assuming the system is in a quiescent state, it will be assumed that the valve 18 is in its center or neutral position, as illustrated, and that a prime mover (not shown), provided for driving the pump 12, is started. The displacement control mechanism 16 is spring biased to full displacement so that the pump 12 is in stroke when it is started. The pump 12 thus delivers an output to the input port of the control valve 18. As much flow as possible passes through the restrictions 48 and 46 to the fixed orifice 44. A limited amount of flow then passes from the fixed orifice 44 to reservoir 14. However, when flow reaches the orifice 44, pressure rises and is transmitted by means of port 50 and control signal line 52 to sensor valve 54. When enough pressure builds up to overcome the bias of spring 58, sensor valve 54 is shifted into position 56. The control pressure signal 52 is then placed in fluid communication with the displacement control mechanism 16 to reduce the output of pump 12 to a minimal level. Typically, pump output flow will be reduced to approximately 1 gpm and pump output pressure will be reduced to approximately 300 psi.

It should be noted that in this preferred embodiment the valve plungers 20 and 22 are connected in a parallel configuration such that both plungers are always in fluid communication with the pump 12. Should the operator displace one of the plungers by a small amount so as to meter a relatively small amount of fluid to one of the service ports, the signal flow through restrictions 48 and 46 is reduced. This reduced flow generates a lower pressure at port 50 which in turn reduces the control signal pressure bias applied to valve 54. When the control signal bias drops below that applied in the opposite direction by spring 58, the sensor valve 54 shifts to positior 60 permitting flow from the displacement control mechanism 16 to reservoir 14. The spring bias of the displacement control mechanism 16 will increase the displacement of pump 12 until the pressure build up at port 50 is sufficient to fluid bias valve 54 out of position 60. Thus, should the operator meter a small amount of fluid to a fluid actuated device, pump displacement will increase to an amount intermediate minimum and maximum flow until an equilibrium condition is reached.

Accordingly, should either of the plungers 20 or 22 be fully actuated to one of the operating positions, all flow to port 50 would stop and thus the pressure at port 50 would drop to zero. Under these circumstances, sensor valve 54 would remain in position 60 and pump 12 would be spring biased to its full displacement position.

It should be further understood that although the above discussion dealt only with metering flow to a single fluid actuated device, that should any or all of the plungers in valve 18 be placed in a position to meter fluid to a service port some flow would still be delivered to control pressure port 50 and thus the pump 12 would establish an equilibrium position intermediate its minimum and maximum output. It is only when at least one plunger is activated to its full operating position that the pump 12 will be biased into full displacement.

Figure 2:
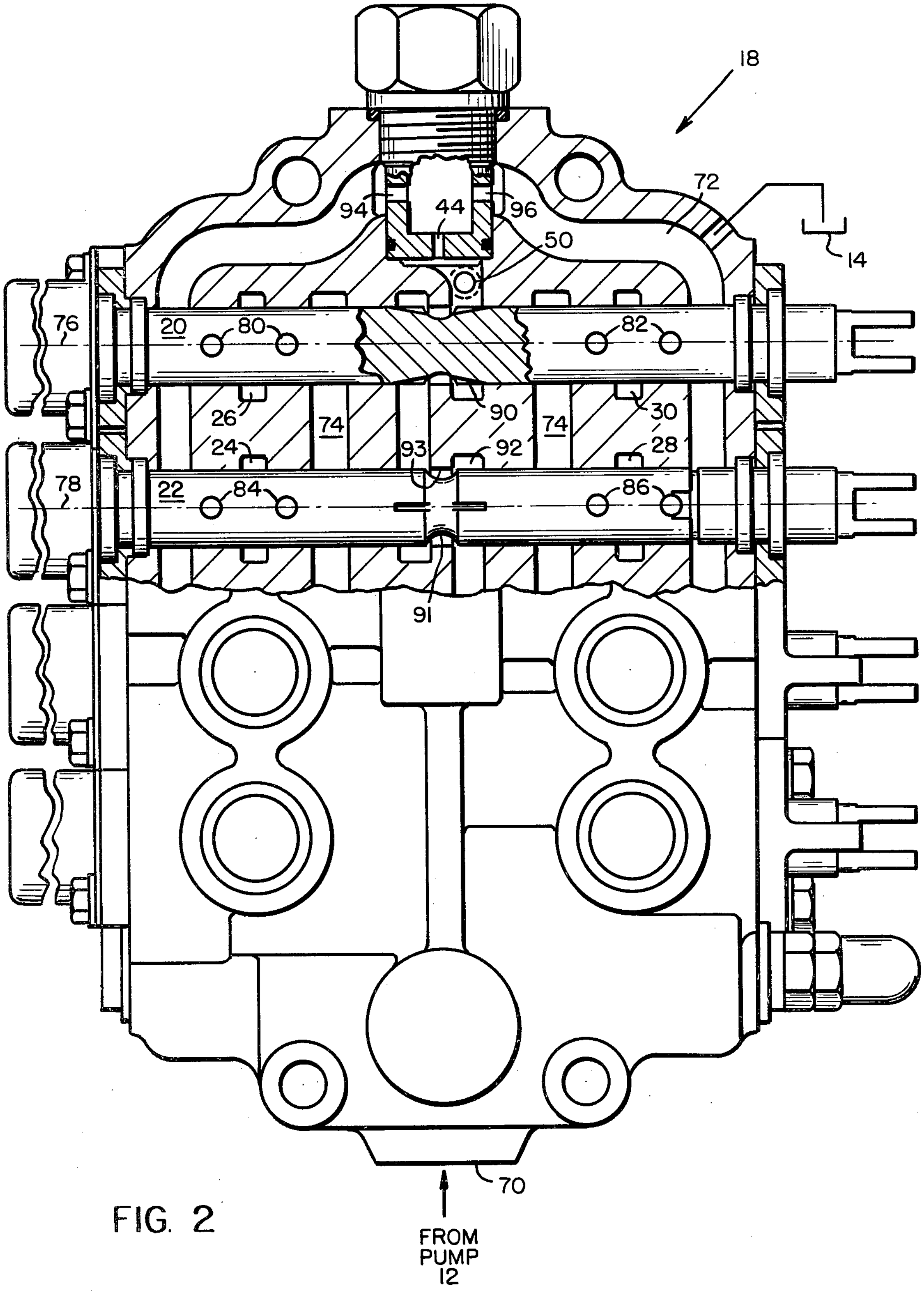
FIG. 2 shows a front view in partial cross-section of a control valve suitable for use in the hydraulic control system shown in FIG. 1.

FIG. 2 shows a control valve for use in the hydraulic control system shown in FIG. 1. In this Figure like numbers will be utilized to identify like elements. Thus, a control valve 18 includes an inlet port 70 adapted to be connected to the output of pump 12 and an exhaust port in fluid communication with an exhaust manifold 72 and reservoir 14. The valve 18 further includes a plurality of service ports 24 and 28, and 26 and 30 for delivering fluids to a fluid actuated device (not shown). The valve 18 further includes a plurality of generally cylindrical plungers 20 and 22 having an outer surface extending substantially symmetrically about longitudinal axis 76 and 78 respectively. Each of the plungers 20 and 22 includes a neutral position in which fluid communication between the supply manifold 74 and the service ports is blocked. Each of the plungers 20 and 22 further includes a pair of operating positions wherein a service port is placed in fluid communication with the supply manifold 74. This is accomplished by means of a plurality of pairs of radial ports 80 and 82 on plunger 20 and 84 and 86 on plunger 22. Each pair of ports includes an interconnecting closed axial bore placing the pair of ports in fluid communication with one another.

Each of the plungers 20 and 22 includes a plurality of metering notches 90 for providing the only continuous flow path to the supply manifold between the inlet and the exhaust port when the plungers are between their neutral position and an operating position. These metering notches 90 make up the variable flow restrictions 46 and 48 shown in FIG. 1. Each of the plungers 20 and 22 further includes a recessed portion 91 positioned so as to be centered within a central passageway 92 when the plungers are in their neutral position. The recessed portions 91 are of sufficient depth so that they present no significant restriction to flow through the passageway 92 when the plungers are exactly in their neutral positions. However, the recessed portions 91 are in fluid communication with metering notches 90 and have a sufficiently small axial dimension so as to cooperate with the valve lands 93 to prevent direct flow through the recessed portions 91 when a given plunger is moved away from its neutral position a small axial distance and force all flow through metering notches 90. The axial dimension of the portions 91 is much smaller than the axial dimension of similar portions of standard parallel control valves. Thus it is apparent that the axial dimension of each portion 91 is only slightly greater than the width of lands 93.

Each of the metering notches comprises a narrow channel in the outer surface of the plunger extending parallel to the longitudinal axis of the plunger. It is apparent from the structure of these notches that as a plunger is moved from the neutral position toward one of the operating positions direct flow through the recessed portion 91 will soon be prevented by land 93 and all flow through portion 91 and passageway 92 must utilize the metering notches 90. Thus as the plunger approaches an operating position, the amount of flow permitted to proceed upstream of that plunger along the central passageway 92 of the valve will be gradually reduced and eventually stopped. Although four such metering notches 90 are illustrated on each valve plunger, it should be understood, that a greater or lesser number could be provided as long as the hydrostatic balance of the valve plunger were not adversely affected.

The valve 18 further includes the fixed orifice 44 positioned at the end of the central passageway 92 as was illustrated in FIG. 1. Additional orifices 94 and 96 may be provided in the exhaust manifold 72 and may even be sized so as to eliminate the need for orifice 44. The orifice 44 is, of course, positioned downstream of the last plunger and the control pressure port 50 is positioned in the central core downstream of the plungers but upstream of the orifice 44.

Thus, it is apparent, from the structure of the metering notches 90 and the location of the fixed orifice 44 and the control pressure port 50, that as any plunger is moved from its neutral position toward one of the operating positions, flow in the central passageway 92 will be reduced and the resultant control signal will be highly responsive to even small movements of the plunger.

Figure 3:
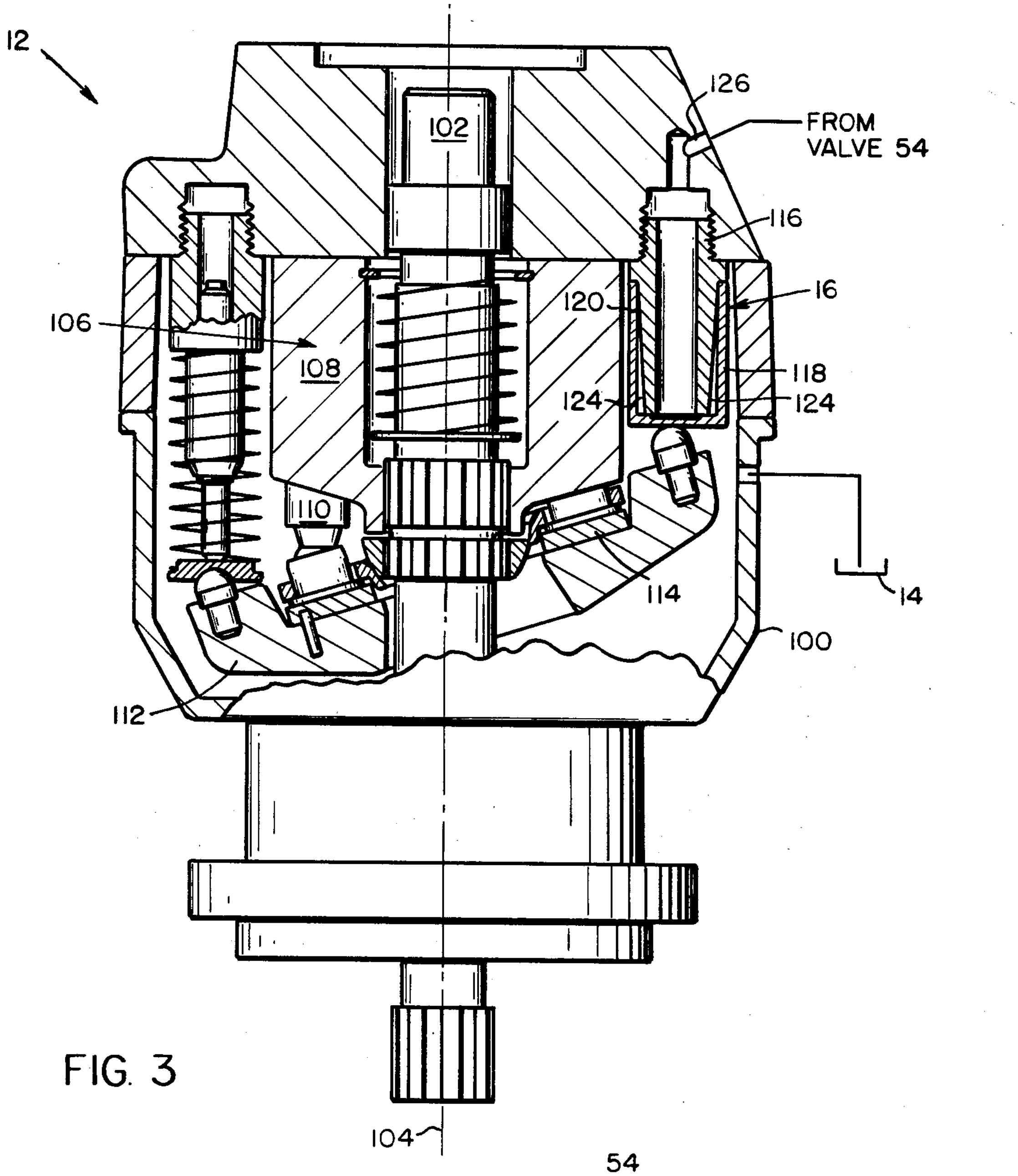
FIG. 3 shows a partial cross-sectional view of a variable displacement pump suitable for use in the hydraulic control system shown in FIG. 1.

FIG. 3 shows a variable displacement axial piston pump suitable for use with the control system of the present invention. The pump 12 includes a housing 100, inlet and outlet ports (not shown), and a drain (not shown) adapted to permit the return of excess fluid to reservoir 14. A drive shaft 102 positioned within the housing 100 extends substantially symmetrically about axis 104. A pumping assembly 106 is positioned about the drive shaft and is adapted to pump fluid from the pump inlet to the pump outlet. The pumping assembly includes a cylinder block 108 affixed to the drive shaft 102 and adapted to rotate therewith. A plurality of pistons 110 are adapted to reciprocate along linear paths of travel within the cylinder block 108. An adjustable swash plate assembly 112 is attached to one end of each of the pistons. The swash plate assembly includes a standard wear plate 114 adapted to bear against the rotating pistons 110 and the angle of the swash plate assembly with respect to the drive shaft axis 104 determines the degree of reciprocation of the pistons 110 and therefore the displacement of the pump.

A fluid actuated displacement control mechanism 16 is mechanically connected to the swash plate assembly 112 for controlling the displacement of the pumping assembly 106. The displacement control mechanism 16 includes a fluid passage for placing the mechanism in fluid communication with the reservoir 14 and includes a flow restriction which varies in response to the position of the mechanism. The displacement control mechanism includes a hollow control post 116 affixed to the pump housing 100, preferably by threaded engagement therewith. The hollow control post 116 has a generally cylindrical outer surface. A control piston 118 has a cylindrical wall defining a cylindrical inner surface 120 in sliding engagement with the cylindrical outer surface of the control post 116. The variable flow restriction is formed by a pair of tapered planar portions 124 on the outer surface of the control post. These tapered planar portions 124 are positioned so as to permit a variable degree of fluid communication between the hollow interior of the control post and the reservoir 14 while the displacement control mechanism controls the displacement of the pumping assembly.

It is apparent that as the control signal 52 from valve 54 is delivered to port 126 and thus to the interior of the control post 116 the head of the piston 118 is forced into mechanical engagement with the yoke assembly 112 to destroke the pump. As the head of the piston 118 moves away from the end of the control post 116 a small amount of fluid is free to flow in the gaps between the planar portions 124 and the interior surface 120 of the piston 118. This fluid will continue to flow around the end of piston 118 to the case drain and to reservoir 14. This orifice gradually increases in size as the pump is destroked.

Thus, it is apparent, that at low pump output the responsiveness of the displacement control mechanism to the control signal 52 is reduced. This has the desirable effect of enhancing the metering capabilities of the system by minimizing hunting. Conversely, of course, at high pump output the control is more responsive and at full pump output the orifice disappears altogether.

Figure 4:
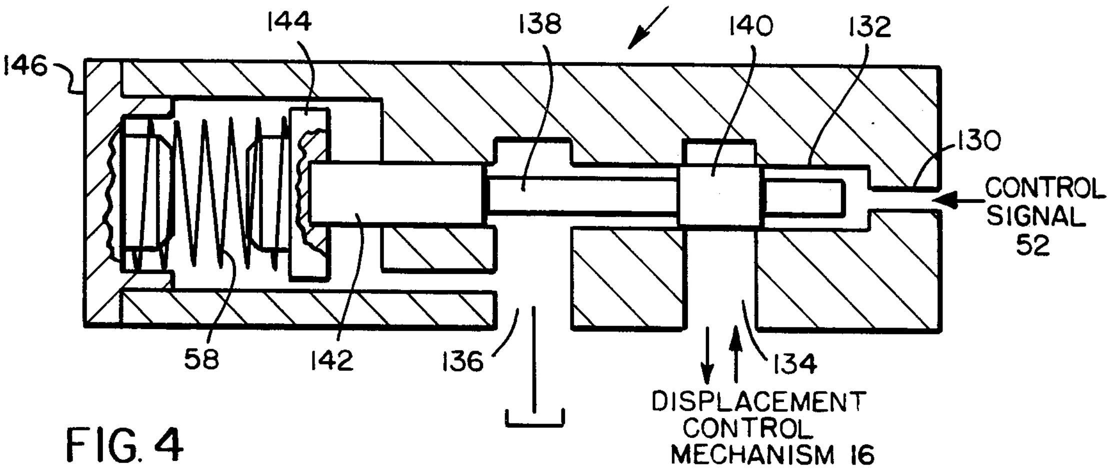
FIG. 4 shows a schematic diagram of a sensor valve suitable for use in the hydraulic control system shown in FIG. 1.

FIG. 4 shows a schematic representation of the sensor valve 54 of the present invention. Control signal 52 is applied to an inlet port 130 which leads to a central bore 132. An outlet port 134 leads to the displacement control mechanism 16. Another outlet port 136 leads to the reservoir 14. A spool 138 is positioned within the bore 132 and includes a pair of lands 140 and 142. A spring seat 144 is positioned against land 142 and retains spring 58 against a cap 146. Thus, the spool 138 is spring biased toward the port 130. The land 140 is of sufficient length to block the port 134.

Thus, it is apparent that when the control signal 52 is of sufficient magnitude to depress the spring 58 against the cap 146 the control signal 52 will be placed in fluid communication with the displacement control mechanism 16. Conversely, when the spring bias applied to spool 138 by spring 58 exceeds the fluid bias applied by control signal 52 the spool will move toward port 130 and displacement control mechanism 16 will be placed in fluid communication with reservoir 14 by means of port 134, bore 132 and port 136.

Figure 5:
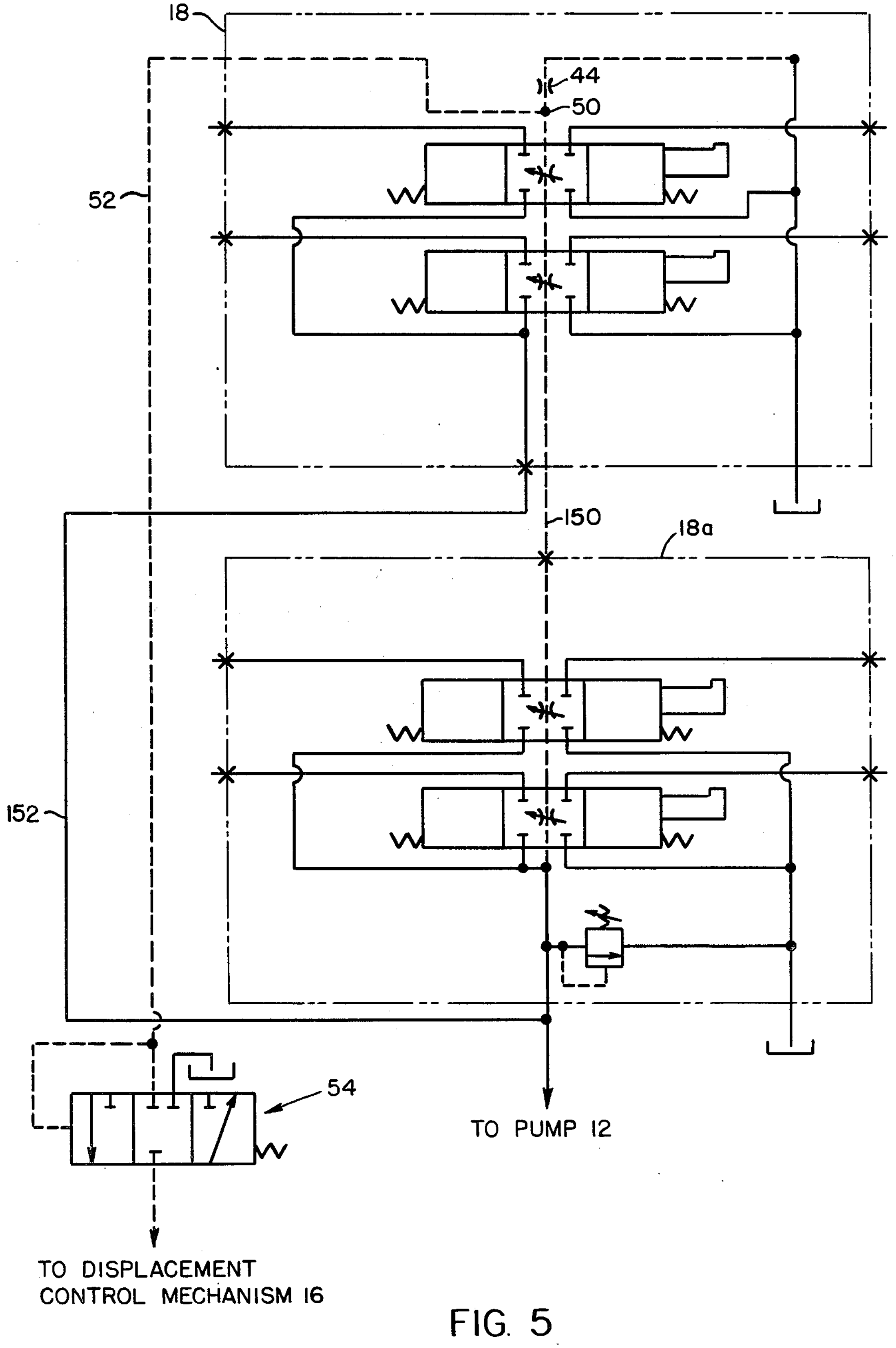
FIG. 5 shows a graphic diagram of a second embodiment of the hydraulic control system of the present invention.

FIG. 5 shows a second embodiment of the hydraulic control circuit of the present invention which is identical to the embodiment shown in FIG. 1 with the exception that a second control valve 18*a* is utilized in addition to control valve 18 to provide fluid distribution to additional fluid actuated devices delivered by the same pump 12. The valve 18*a* is identical to the valve 18 with the exception that control port 50 and fixed orifice 44 have been removed so that the central passageway signal line 150 is connected in series between valve 18*a* and valve 18. Likewise, a service line 152 places the inlet ports of valves 18*a* and 18 in parallel assuring fluid delivery to valve 18 even should one or both of the plungers in valve 18*a* be placed in an operating position. The principles of operation of this system are identical to that shown in FIG. 1.

Figure 6:
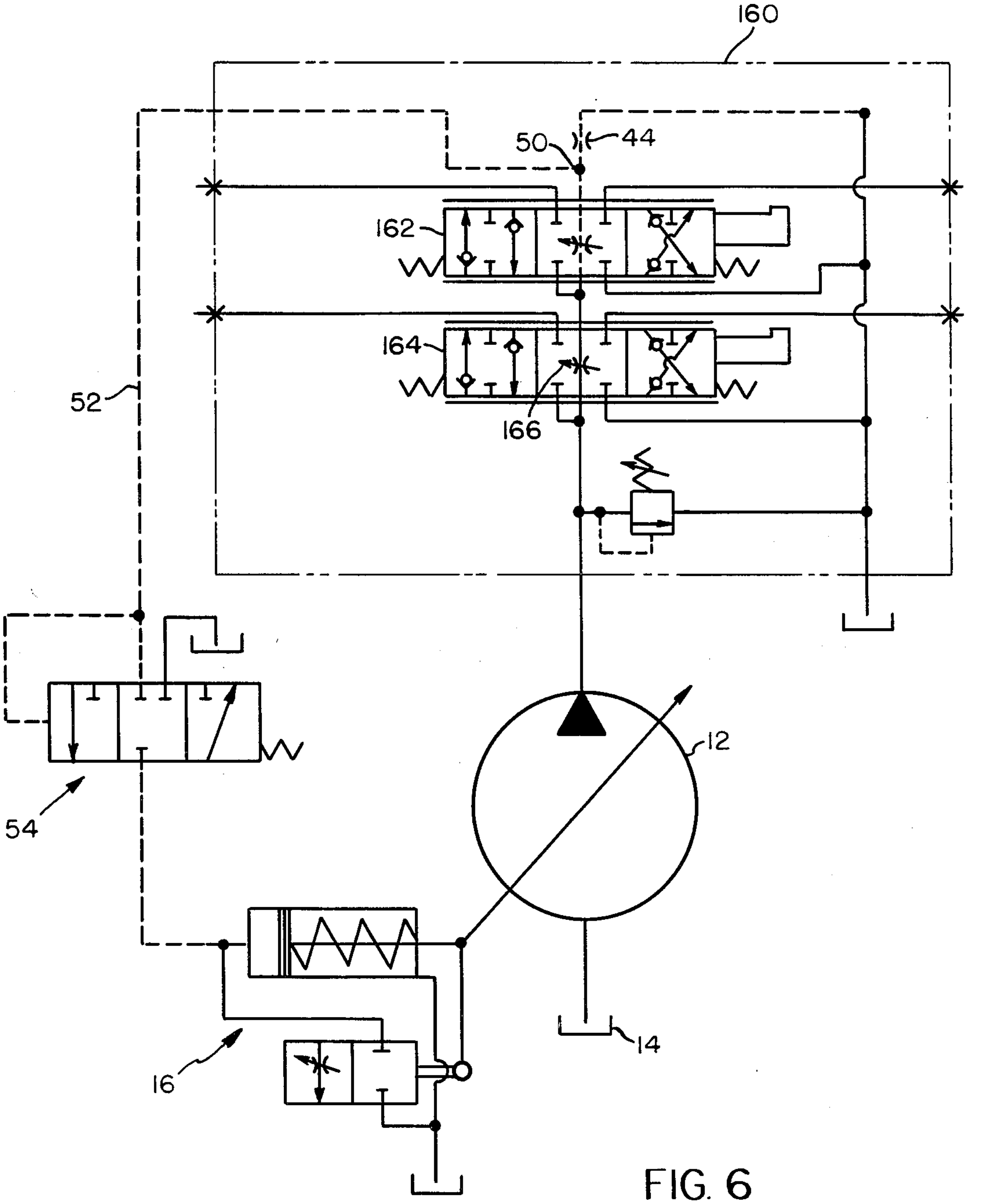
FIG. 6 shows a graphic diagram of a third embodiment of the hydraulic control system of the present invention.

FIG. 6 shows a graphic representation of a third embodiment of the hydraulic control system of the present invention in which the control valve 18 is replaced by a control valve 160 in which a plurality of control plungers 162 and 164 are connected in tandem, as opposed to the parallel configuration shown in valve 18. Thus, fluid will be supplied to plunger 162 only through variable restriction 166. Thus, as plunger 164 is moved toward an operating position, plunger 162 will receive no operating fluid. This type of arrangement is useful only in situations where the fluid actuated device supplied by plunger 164 has a much higher priority in the circuit than that supplied by plunger 162. In all other respects, the operation of the system shown in FIG. 6 is identical to that shown in FIG. 1.

Thus, it is apparent that a hydraulic control system has been provided which is capable of controlling the distribution of fluid to a plurality of fluid actuated devices in a highly efficient and responsive manner. This system is not subject to signal reversals as a result of gravitational forces acting on the fluid actuated devices since there is no feedback from the load. Additionally, the system requires the use of only a single control line to the pump. The control valve utilized in the system develops a control signal for the pump which is responsive to the position of the individual valve plungers. Furthermore, the displacement control mechanism for the pump further improves the responsiveness of the system. Since this system requires relatively simple and inexpensive modifications to existing control systems, it may be easily manufactured.

While there have been described what are at the present considered to be the preferred embodiments of the present invention, it will be obvious to those skilled in the art that various changes and modifications may be made therein, without departing from the invention, and it is, therefore, aimed in the appended claims to cover all such changes and modifications as fall within the true spirit and scope of the present invention.

What we claim is:

1. A hydraulic control system comprising:

a fluid reservoir;

a variable displacement pump having a fluid input in fluid communication with said reservoir and having a fluid output;

a fluid actuated displacement control mechanism for controlling the displacement of said pump;

a control valve in fluid communication with the fluid output of said variable displacement pump and with said reservoir and being adapted to control the flow of fluid to a fluid actuated device, said control valve including means for developing a control pressure signal; and a sensor valve in fluid communication with said control pressure signal, said displacement control mechanism, and said reservoir for placing said control pressure signal in fluid communication with said displacement control mechanism or for placing said displacement control mechanism in fluid communication with said reservoir in response to the magnitude of said pressure control signal to thereby control the displacement of said pump in response to the magnitude of said pressure control signal.

2. A hydraulic control system as defined in claim 1, wherein said sensor valve includes means for placing said control signal in fluid communication with said displacement control mechanism when said control signal exceeds a predetermined pressure, to thereby decrease pump displacement and means for placing said displacement control mechanism in fluid communication with said reservoir when said control signal is less than said predetermined pressure to thereby increase pump displacement.

3. A hydraulic control system as defined in claim 2, wherein said sensor valve further includes means for blocking fluid communication between said control signal, said displacement control mechanism, and said reservoir when said control signal equals said predetermined pressure, to thereby maintain pump displacement at a fixed level.

4. A hydraulic control system as defined in claim 1, wherein said control valve includes:

a least one service port adapted to be connected to a fluid actuated device, a neutral position in which fluid communication between said variable displacement pump and said service port is blocked, and at least one operating position wherein the fluid output of said variable displacement pump is placed in fluid communication with said service port, wherein said means for developing a control pressure signal includes a fixed orifice for restricting flow between said variable displacement pump and said reservoir and wherein said control valve further includes means for restricting flow in a flow path between said variable displacement pump and said fixed orifice when said control valve is between said neutral position and said operating position, said flow restricting means providing a variable restriction in said flow path as said valve is moved from said neutral position toward said operating position.

5. A hydraulic control system as defined in claim 4, wherein said control valve includes at least one valve plunger adapted to be placed in said neutral position and said operating position and wherein said flow restricting means comprises at least one metering notch in said valve spool.

6. A hydraulic control system as defined in claim 5 wherein said control valve includes a land in said central passageway and wherein said plunger includes a recessed portion positioned within said central passageway and in fluid communication with said metering notch for cooperating with said valve land to force fluid flow through said metering notch when said plunger is moved from said neutral position toward said operating position.

7. A hydraulic control system as defined in claim 6, wherein said control valve includes a plurality of valve plungers adapted to be placed in said neutral and said operating position and wherein said flow restricting means comprises at least one metering notch on each of said valve plungers for permitting fluid communication between said variable displacement pump and said fixed orifice.

8. A hydraulic control system as defined in claim 7 wherein each of said plungers is generally cylindrical and includes an outer surface extending substantially symmetrically about a longitudinal axis, and wherein each of said metering notches comprises a narrow channel in said outer surface extending parallel to said longitudinal axis.

9. A hydraulic control system as defined in claim 4, wherein said means for developing a control pressure signal includes a control pressure port positioned between said variable orifice and said fixed orifice for delivering said control pressure signal to said sensor valve.

10. A hydraulic control system as defined in claim 1, wherein said variable displacement pump includes a housing containing said fluid input and said fluid output and a drain in said housing adapted to permit the return of excess fluid to said reservoir, a drive shaft positioned within said housing and extending substantially symmetrically about an axis, and a pumping assembly positioned about said drive shaft and adapted to pump fluid from said fluid input to said fluid output, and wherein said fluid actuated displacement control mechanism is mechanically connected to said pumping assembly for controlling the displacement of said pumping assembly, said mechanism further including a fluid passage for placing said mechanism in fluid communication with said drain, and said fluid passage including a flow restriction which varies in response to the position of said mechanism.

11. A hydraulic control system as defined in claim 10 wherein said fluid actuated displacement control mechanism comprises a hollow control post having a generally cylindrical outer surface and a control piston having a cylindrical wall defining a cylindrical inner surface in sliding engagement with the cylindrical outer surface of said control post, and said variable flow restriction comprising a pair of tapered planar portions on the outer surface of said control post, positioned so as to permit a variable degree of fluid communication between the hollow interior of said control post and said drain while said displacement control mechanism controls the displacement of said pumping assembly.

12. A hydraulic control system as defined in claim 11 wherein said pumping assembly includes a cylinder block affixed to said drive shaft and adapted to rotate therewith, a plurality of pistons adapted to reciprocate along linear paths of travel within said cylinder block, and an adjustable swash plate assembly attached to one end of each of said pistons, the angle of said swash plate assembly with respect to said drive shaft axis determining the displacement of said pump, said displacement control piston being positioned to engage said swash plate assembly to thereby control the position of said swash plate assembly and correspondingly the displacement of said pump.

13. A hydraulic control system as defined in claim 1 further including a second control valve in fluid communication with the fluid output of said variable displacement pump and with said reservoir and being adapted to control the flow of fluid to a fluid actuated device.

14. A hydraulic control system as defined in claim 1, wherein said control valve includes a plurality of valve plungers which are connected in series such that one of the plungers is dependent for fluid flow on fluid passing through the other of said plungers.

15. In a control valve including inlet and exhaust ports, a plurality of service ports, a supply manifold in fluid communication with said inlet port, an exhaust manifold in fluid communication with said exhaust port, a central passageway in fluid communication with said inlet port and said exhaust manifold and a plurality of plungers for controlling the flow of fluid between said supply manifold, said service ports, said central passageway, and said exhaust manifold, each of said plungers having a neutral position in which fluid communication between said supply manifold and a service port is blocked, and at least one operating position wherein at least one service port is placed in fluid communication with said supply manifold, the improvement comprising:

each of said plungers including a plurality of metering notches for providing the only continuous flow path through said central passageway between said inlet and said exhaust port when said plungers are between said neutral position and said operating position.

16. A control valve as defined in claim 15 wherein each of said plungers is generally cylindrical and includes an outer surface extending substantially symmetrically about a longitudinal axis, and wherein each of said metering notches comprises a narrow channel in said outer surface extending parallel to said longitudinal axis.

17. A control valve as defined in claim 15 wherein said control valve includes a plurality of lands in said central passageway and wherein each of said plungers includes a recessed portion positioned within said central passageway and in fluid communication with said metering notches for cooperating with said valve lands to force fluid flow through said metering notches when said plunger is moved from said neutral position toward said operating position.

18. A control valve as defined in claim 15 further including a fixed orifice for restricting flow between said inlet and said exhaust port through said central passageway, said fixed orifice being positioned downstream of said plungers.

19. A control valve as defined in claim 18 further including a control pressure port positioned in said central passageway downstream of said plungers but upstream of said fixed orifice.

20. A variable displacement pump comprising:

a housing having inlet and outlet ports and a drain therein adapted to permit the return of excess fluid to a reservoir;

a drive shaft positioned within said housing and extending substantially symmetrically about an axis;

a pumping assembly positioned about said drive shaft and adapted to pump fluid from said inlet to said outlet; and a fluid actuated displacement control mechanism, mechanically connected to said pumping assembly for controlling the displacement of said pumping assembly, said mechanism including a fluid passage for placing said mechanism in fluid communication with said drain, and said fluid passage including a flow restriction which varies in response to the position of said mechanism.

21. A variable displacement pump as defined in claim 20 wherein said fluid actuated displacement control mechanism comprises a hollow control post having a generally cylindrical outer surface and a control piston having a cylindrical wall defining a cylindrical inner surface in sliding engagement with the cylindrical outer surface of said control post, and said variable flow restriction comprising a pair of tapered planar portions on the outer surface of said control post, positioned so as to permit a variable degree of fluid communication between the hollow interior of said control post and said drain while said displacement control mechanism controls the displacement of said pumping assembly.

22. A variable displacement pump as defined in claim 21 wherein said pumping assembly includes a cylinder block affixed to said drive shaft and adapted to rotate therewith, a plurality of pistons adapted to reciprocate along linear paths of travel within said cylinder block and an adjustable swash plate assembly attached to one end of each of said pistons, the angle of said swash plate assembly with respect to said drive shaft axis determining the displacement of said pump, said displacement control piston being positioned to engage said swash plate assembly to thereby control the position of said swash plate assembly and correspondingly the displacement of said pump.

* * * * *